US012602918B2

(12) United States Patent
Ando

(10) Patent No.: US 12,602,918 B2
(45) Date of Patent: Apr. 14, 2026

(54) LEARNING DATA GENERATING APPARATUS, LEARNING DATA GENERATING METHOD, AND NON-TRANSITORY RECORDING MEDIUM HAVING LEARNING DATA GENERATING PROGRAM RECORDED THEREON

(71) Applicant: OLYMPUS MEDICAL SYSTEMS CORP., Tokyo (JP)

(72) Inventor: Jun Ando, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 312 days.

(21) Appl. No.: 18/223,648

(22) Filed: Jul. 19, 2023

(65) Prior Publication Data

US 2024/0029419 A1    Jan. 25, 2024

Related U.S. Application Data

(60) Provisional application No. 63/390,690, filed on Jul. 20, 2022.

(51) Int. Cl.
*G06V 10/75* (2022.01)
*G06V 10/82* (2022.01)
(52) U.S. Cl.
CPC ............ *G06V 10/82* (2022.01); *G06V 10/751* (2022.01)
(58) Field of Classification Search
CPC ...... G06V 10/82; G06V 10/751; G06V 10/25; G06V 10/774
See application file for complete search history.

(56) References Cited

U.S. PATENT DOCUMENTS

2022/0392107 A1* 12/2022 Kitazawa .................. G06T 3/40
2023/0334360 A1* 10/2023 Kormilitsin ......... G06F 18/2115
2025/0209777 A1* 6/2025 Saikou .................. G06T 7/0012

FOREIGN PATENT DOCUMENTS

JP        2021-140481 A      9/2021

OTHER PUBLICATIONS

Xinlei Chen, et al., "Exploring Simple Siamese Representation Learning", pp. 15750-15758, CVPR 2021.

* cited by examiner

*Primary Examiner* — Han Hoang
(74) *Attorney, Agent, or Firm* — Scully, Scott, Murphy & Presser, P.C.

(57) ABSTRACT

A learning data generating apparatus receives first training data, first correct answer information, and second training data, inputs the first and second training data into a neural network to thereby cause the neural network to output first and second array groups each constituted of a plurality of arrays, identifies a first array from the first array group based on the first correct answer information, the first array being an array corresponding to the recognition target, and compares the first array and each of the plurality of arrays constituting the second array group, to create second correct answer information corresponding to the second training data.

12 Claims, 9 Drawing Sheets

FIG. 4

LEARNING DATA GENERATING APPARATUS, LEARNING DATA GENERATING METHOD, AND NON-TRANSITORY RECORDING MEDIUM HAVING LEARNING DATA GENERATING PROGRAM RECORDED THEREON

RELATED APPLICATION DATA

This application is based on and claims priority under 35 U.S.C. § 119 to U.S. Provisional Application No. 63/390, 690 filed on Jul. 20, 2022, the entire contents of which are incorporated herein by reference.

BACKGROUND

The present disclosure relates to a learning data generating apparatus, a learning data generating method, and a non-transitory recording medium having a learning data generating program recorded thereon, each capable of reducing the labor of creating teaching data.

DESCRIPTION OF RELATED ART

In recent years, a technique of supporting determination, which had been conventionally performed visually by human beings, utilizing AI (artificial intelligence) based on image data has developed in various fields.

The foregoing AI is implemented by constructing a function of, in response to data inputted, outputting a judgement result corresponding to the data. As the function, a neural network is frequently used. A learning technology of AI that uses a multi-layer neural network is referred to as deep learning. In deep learning, a large volume of teaching data, which includes a pair of training data and correct answer information corresponding to the training data, is prepared. The correct answer information is manually created by providing a label representing what a determination target is, or marking (i.e., annotating) a region of the determination target. The neural network includes a number of product-sum operations, and multipliers are referred to as weights. "Learning/training" is performed by adjusting the weights so that an output, which is obtained when training data included in teaching data is inputted into the neural network, becomes closer to the corresponding correct answer information. An inference model that is a trained neural network can perform "inference" for providing an appropriate solution to an unknown input.

For example, to create an inference model for determining a lesion area in a body, endoscopic images (i.e., moving images) can be adopted as images serving as a basis for teaching data. Teaching data is created by a human being by picking up a still image from the acquired moving images, and then manually marking (i.e., annotating) the position of the lesion area (i.e., the position of a correct answer), for example.

SUMMARY

A learning data generating apparatus according to an aspect of the present disclosure includes a processor including hardware, the processor being configured to receive first training data obtained by picking up a still image from a series of images and first correct answer information that is position information of a region in which a recognition target is appearing in the first training data: receive second training data obtained by picking up a still image from the series of images; input the first training data into a neural network to thereby cause the neural network to output a first array group (also called feature map) constituted of a plurality of arrays; input the second training data into a neural network to thereby cause the neural network to output a second array group constituted of a plurality of arrays; identify a first array from the first array group based on the first correct answer information, the first array being an array corresponding to the recognition target; and compare the first array and each of the plurality of arrays constituting the second array group, to estimate a region in which the recognition target is appearing in the second training data, to create second correct answer information in the second training data, the second correct answer information being position information of the recognition target.

A learning data generating method according to an aspect of the present disclosure is a learning data generating method performed with a learning data generating apparatus, the apparatus including an image input unit, a first neural network application unit, a second neural network application unit, a correct answer position input unit, and an output checking unit, the method including acquiring, with the image input unit, first training data obtained by picking up a still image from a series of images and first correct answer information that is position information of a recognition target in the first training data, acquiring, with the image input unit, second training data obtained by picking up a still image from the series of images; inputting, with the first neural network application unit, the first training data into a neural network to thereby cause the neural network to output a first array group constituted of a plurality of arrays; inputting, with the second neural network application unit, the second training data into a neural network to thereby cause the neural network to output a second array group constituted of a plurality of arrays; identifying, with the correct answer position input unit, a first array which corresponding to the recognition target, from the first array group based on the first correct answer information; and comparing, with the output checking unit, the first array and each of the plurality of arrays constituting the second array group, to estimate a region in which the recognition target is appearing in the second training data, to create second correct answer information that is position information of the second training data.

In a non-transitory recording medium having a learning data generating program recorded thereon according to an aspect of the present disclosure, the learning data generating program is configured to cause a learning data generating apparatus to acquire first training data obtained by picking up a still image from a series of images and first correct answer information that is position information of a recognition target in the first training data; acquire second training data obtained by picking up a still image from the series of images; input the first training data into a neural network to thereby cause the neural network to output a first array group constituted of a plurality of arrays; input the second training data into a neural network to thereby cause the neural network to output a second array group constituted of a plurality of arrays; identify a first array which corresponding to the recognition target, from the first array group based on the first correct answer information; and compare the first array and each of the plurality of arrays constituting the second array group to thereby estimate a region in which the recognition target is appearing in the second training data, to create second correct answer information that is position information of the second training data.

BRIEF DESCRIPTION OF THE DRAWINGS

FIG. 4 is an explanatory view for illustrating the operation in the first embodiment.

DETAILED DESCRIPTION

To build an inference model with high inference accuracy, a sufficient number of teaching data to be used for learning are needed. However, as described above, teaching data is obtained by manually annotating images picked up from a series of images, such as endoscopic images. Therefore, when annotation is performed by picking up a sufficient number of images, such as picking up all of the images, an enormous time period would be required to create teaching data, which is problematic.

Note that as disclosed in Japanese Patent Application Laid-Open Publication No. 2021-140481, there is known means of increasing the number of images to be used for learning by performing conversion called data augmentation, such as rotation, horizontal flip, vertical flip, or partial cutting and enlargement, on images prepared by a human being.

However, since data augmentation is just the conversion of images based on a conversion method prepared in advance, it would be impossible to express changes in the color tone of a subject or changes in the way a subject looks due to the influence of a light source or a motion of an image pickup device in the real environment. Further, since learning accuracy may decrease depending on the way of conversion, the management of the conversion method has been laborious.

It is an object of the present invention to provide a learning data generating apparatus, a learning data generating method, and a recording medium having a learning data generating program recorded thereon, each capable of reducing the labor of creating teaching data.

Hereinafter, embodiments of the present invention will be specifically described with reference to the drawings.

First Embodiment

Figure 1:
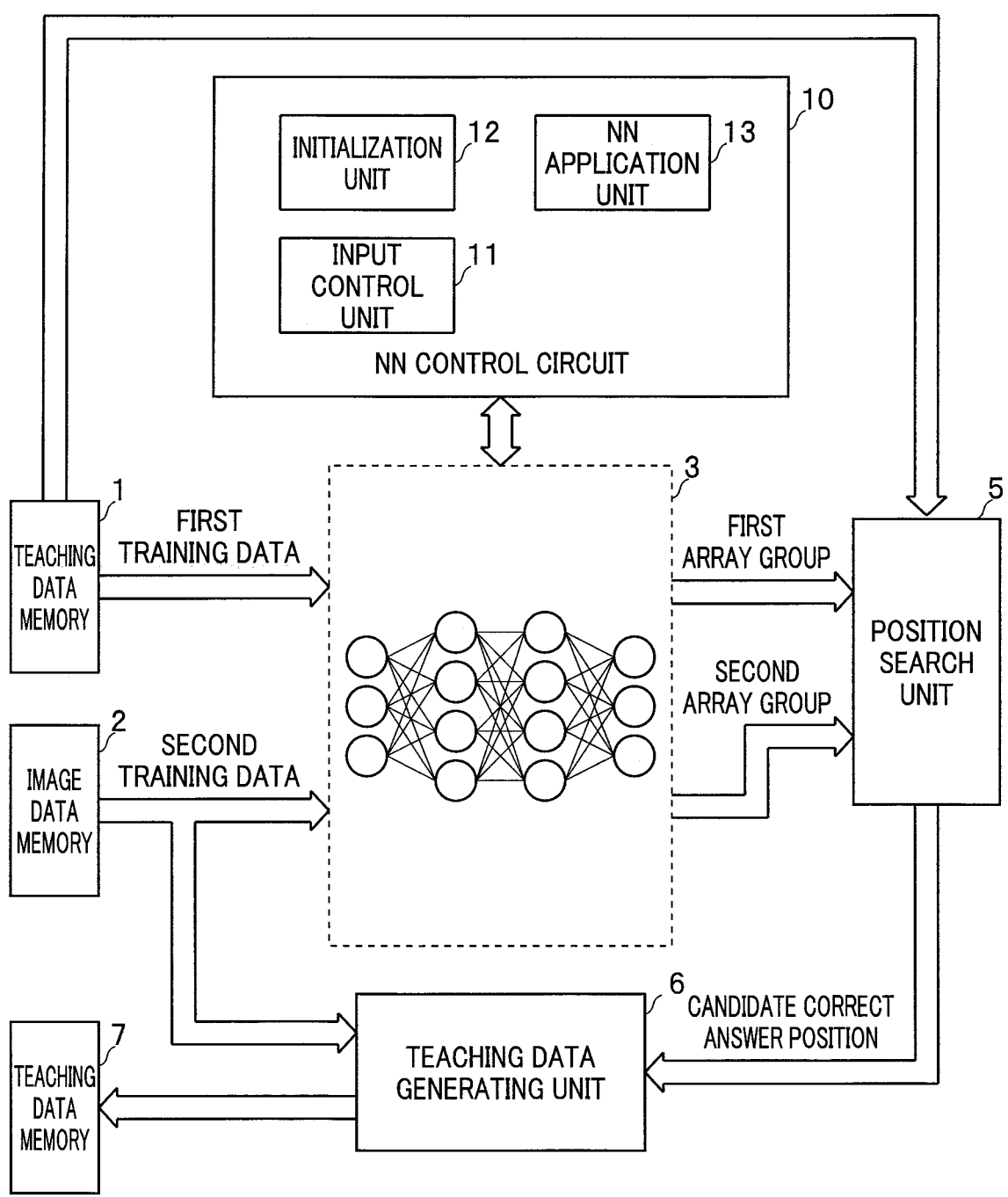
FIG. 1 is a block diagram illustrating a learning data generating apparatus according to a first embodiment of the present disclosure.

FIG. 1 is a block diagram illustrating a learning data generating apparatus according to a first embodiment of the present invention. In the present embodiment, first training data that has been manually annotated and thus is provided with correct answer information is provided to a neural network, and then, correct answer information for second training data that has not been annotated yet is acquired using the obtained vector. This can reduce the time period required to acquire a sufficient number of teaching data.

Note that the present embodiment will exemplarily describe the creation of teaching data when an inference model for performing a lesion area recognition process is created using endoscopic images as images serving as a basis for the teaching data. However, the present invention is not limited to the field of endoscopes, and can also be applied to the creation of teaching data to be used for an inference model for performing other various recognitions.

Figure 2:
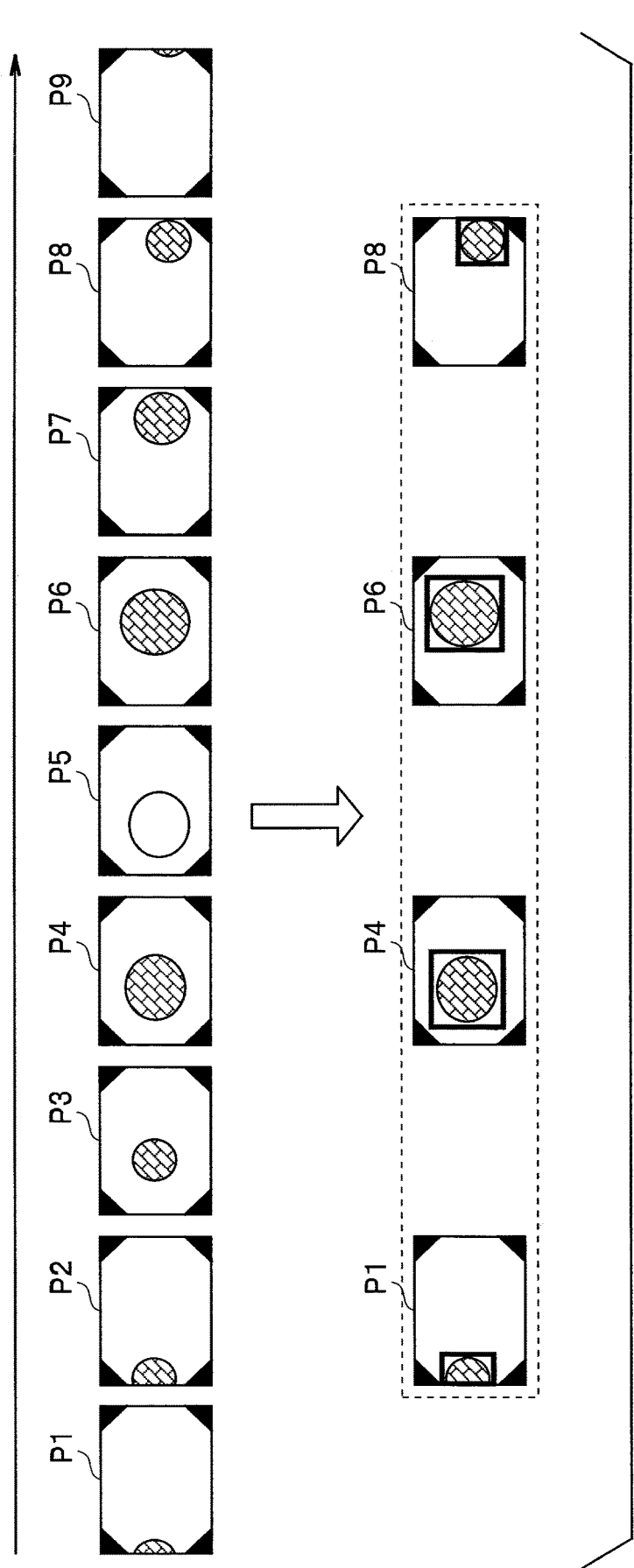
FIG. 2 is an explanatory view for illustrating creating teaching data.

FIG. 2 is an explanatory view for illustrating the teaching data. An image PI is provided to a neural network so that the neural network outputs position information of a recognition target. For example, assume that a still image picked up from endoscopic images includes an image portion PIa of a desired region to be recognized. The neural network can, by learning with a lot of teaching data, output highly accurate position information regarding the position of the image portion PIa of the desired region to be recognized in the image PI. Examples of the desired region to be recognized include a lesion, such as a tumor or an inflammation.

Such teaching data that is needed to train the neural network includes correct answer information including position and class of a recognition target, such as a lesion area, included in a still image. The learning data (or the teaching data) for the neural network, which is used to identify a lesion area, includes training data (i.e., images) to be used for learning, and correct answer information (i.e., correct answer position information and correct answer class information) with which each training data is annotated.

FIG. 2 illustrates a method of creating such teaching data. The upper views of FIG. 2 illustrate a series of endoscopic images including a plurality of frames picked up with an endoscope. A shaded circle in each of images P1, P2, . . . indicates an image portion of a malignant tumor. The lower views of FIG. 2 illustrate images manually picked up from the endoscopic images (hereinafter referred to as selected images). Note that FIG. 2 illustrates an example in which images P1, P4, P6, and P8 are picked up. For each of the selected images, the image portion (i.e., the shaded portion) of the malignant tumor is manually marked with a rectangle by a doctor et al. as illustrated in the lower views of FIG. 2. Position information in the marked image and class information indicating the malignant tumor are acquired as the correct answer information. The selected images are used as training data, and the training data is associated with the correct answer information so that teaching data is obtained.

Such manual marking is quite a hard task. In deep learning, the more the number of teaching data that are used for learning, the higher the performance tends to be. However, if the number of images to be marked is increased as in a case where all of images in focus among the endoscopic images are marked, for example, an enormous time period would be required for the annotation task.

Thus, in the present embodiment, the number of teaching data acquired by manual annotation is reduced, and such teaching data is utilized to allow for the generation of a large number of teaching data. In the present embodiment, correct answer position information for unannotated training data can be acquired using teaching data that has been obtained by annotation.

In FIG. 1, the learning data generating apparatus includes a teaching data memory 1, an image data memory 2, a neural network 3, a position search unit 5, a teaching data generating unit 6, a teaching data memory 7, and a neural network control circuit (hereinafter, an NN control circuit) 10. Note that each or all of the position search unit 5, the teaching data generating unit 6, and the NN control circuit 10 may include one or more processors using a CPU (central processing unit), an FPGA (field programmable gate array), or the like. The one or more processors may be configured to operate in accordance with a program stored in a memory (not illustrated) to control each unit, or may be configured to implement some or all of the functions using an electronic circuit of hardware.

The teaching data memory 1 includes a predetermined storage medium, and stores teaching data including a plurality of training data and a plurality of correct answer information. The teaching data is obtained by performing annotation, such as marking, on selected images (hereinafter referred to as first training data) picked up from a series of endoscopic images (for example, moving images) including a plurality of frames, for example. The teaching data memory 1 is controlled by the NN control circuit 10 (the illustration of which is omitted) to output the first training data stored in the teaching data memory 1 to the neural network 3, and also output the correct answer information stored in the teaching data memory 1 to the position search unit 5.

The image data memory 2 includes a predetermined storage medium, and stores non-selected images (hereinafter referred to as candidate images) other than the selected images, which have been picked up from the series of images serving as a basis for the teaching data, stored in the teaching data memory 1. In other words, the candidate images are not annotated. Training data (hereinafter, second training data) to be supplied to the neural network 3 is selected from among the candidate images. Note that the series of images serving as a basis for the first and second training data may include a plurality of frames each obtained by picking up an image of the same target using the same image pickup apparatus under the same image pickup environment in a period from a first predetermined time point to a second predetermined time point, for example. Note that the same target can be rephrased as the same organ in the endoscopic images, for example. The image pickup apparatus having a image device such as a CCD or a CMOS.

The second training data is an image acquired at a time point relatively close to the acquisition timing of the first training data in the teaching data. Since the second training data is acquired from the same series of images as the first training data, and is acquired at a time point relatively close to the acquisition time point of the first training data, it is considered that the second training data includes an image portion of the same recognition target as the recognition target, such as a lesion area, included in the first training data. Thus, it is estimated that the correct answer class information for the second training data is the same as the correct answer class information for the first training data. The image data memory 2 is controlled by the NN control circuit 10 (the illustration of which is omitted) to output the second training data stored in the image data memory 2 to the neural network 3.

Note that the first training data may be one of a plurality of selected images picked up from a series of images and provided with position information, and the second training data may be an image interposed between the selected images on a time series axis among the series of images. Alternatively, the second training data may be, among the series of images, an image interposed between the first training data and an image of a frame adjacent to the first training data on the time series axis among the selected images. As a further alternative, the second training data may be an image of a frame adjacent to the first training data on the time series axis among the series of images.

The neural network 3 includes an input layer, which includes a plurality of nodes indicated by circles, an intermediate layer (i.e., a hidden layer), and an output layer. Each node is connected to a node of the preceding or following layer, and each connection is provided with a parameter called a weighting factor. Learning/training is a process of updating the parameters so as to minimize training loss. As the neural network 3, a convolutional neural network (CNN) may be adopted, for example.

In the present embodiment, the neural network 3 is not the one trained to recognize the correct answer position information. Should a given neural network be trained to recognize the correct answer position information, it would be necessary to repeatedly provide a sufficient number of teaching data to the neural network to improve the accuracy of the neural network.

In contrast, the neural network 3 of the present embodiment is configured to perform an initial stage of learning using teaching data obtained by manual annotation. Although the neural network 3 needs to calculate a vector with a certain level of meaning, the neural network 3 need not perform learning that allows for the determination or identification of the correct answer position of a lesion area, for example.

The NN control circuit 10 includes an input control unit 11, an initialization unit 12, and an NN application unit 13. The input control unit 11 acquires the teaching data including the first training data and the correct answer information, and stores the teaching data in the teaching data memory 1, and also controls the output of the first training data and the correct answer information stored in the teaching data memory 1. In addition, the input control unit 11 acquires the second training data, and stores the second training data in the image data memory 2, and also controls the output of the second training data stored in the image data memory 2. Note that the input control unit 11 may be configured to determine if the first training data and the second training data have been picked up from same series of images, and if so, input the first and second training data to the neural network 3.

The initialization unit 12 initializes the parameters of the neural network 3. The NN application unit 13 applies the first training data read from the teaching data memory 1 to the neural network 3, and thus causes the neural network 3 to output a first array group including a plurality of vectors (hereinafter also referred to as first arrays). In addition, the NN application unit 13 applies the second training data read from the image data memory 2 to the neural network 3, and thus causes the neural network 3 to output a second array group including a plurality of vectors (hereinafter also referred to as second arrays).

The neural network 3 is controlled by the NN control circuit 10 to output, for each region of the plurality of partial images on the inputted image (i.e., the first training data), vector data indicating image features of the region for each partial images. In addition, the neural network 3 is controlled by the NN control circuit 10 to output, for each region of the plurality of partial images on the inputted image (i.e., the second training data), vector data indicating image features of the region for each partial images.

The vectors of the first and second array groups from the neural network 3 are provided to the position search unit 5. The position search unit 5 is provided with correct answer information (i.e., correct answer position information) for the first training data from the teaching data memory 1. The position search unit 5 identifies which region of the first training data is the correct answer position based on the correct answer position information for the first training data, and determines a vector of the region of the correct answer position from first array group as a correct answer position vector (first array vector). The position search unit 5 acquires a vector for each region of the second training data, and determines an error between the vector of each region and the correct answer position vector. Then, the position search unit 5 determines a region of the second training data where a vector, which has the smallest error with respect to the correct answer position vector (first array vector), is obtained as a candidate for the correct answer position (hereinafter referred to as a candidate correct answer position). The position search unit 5 outputs information on the candidate correct answer position as a result to the teaching data generating unit 6.

The teaching data generating unit 6 is provided with the second training data from the image data memory 2. The teaching data generating unit 6 regards, for the second training data for which the candidate correct answer position has been obtained, the candidate correct answer position as a correct answer position, and then associates the second training data with the position information of the candidate correct answer position, thereby generating teaching data. The teaching data generating unit 6 provides the thus generated teaching data to the teaching data memory 7 so that the teaching data is stored in the teaching data memory 7.

Figure 3:
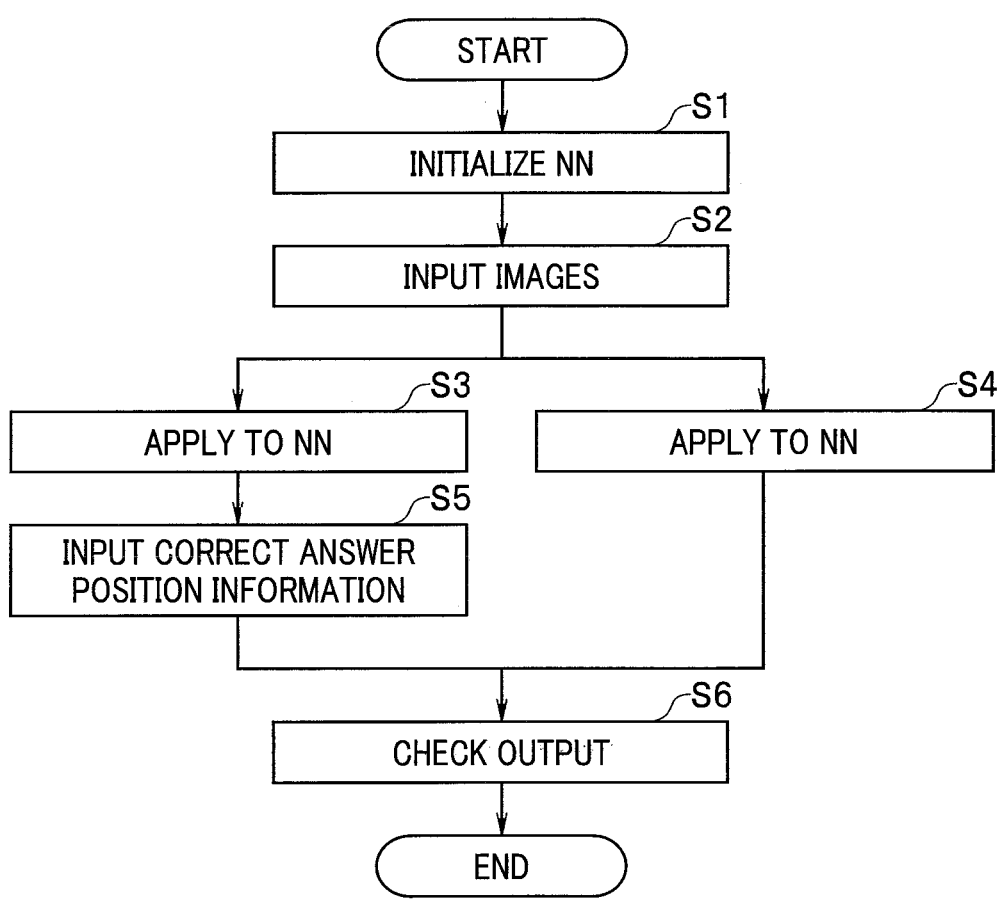
FIG. 3 is a flowchart for illustrating an operation in the first embodiment.
Figure 4:
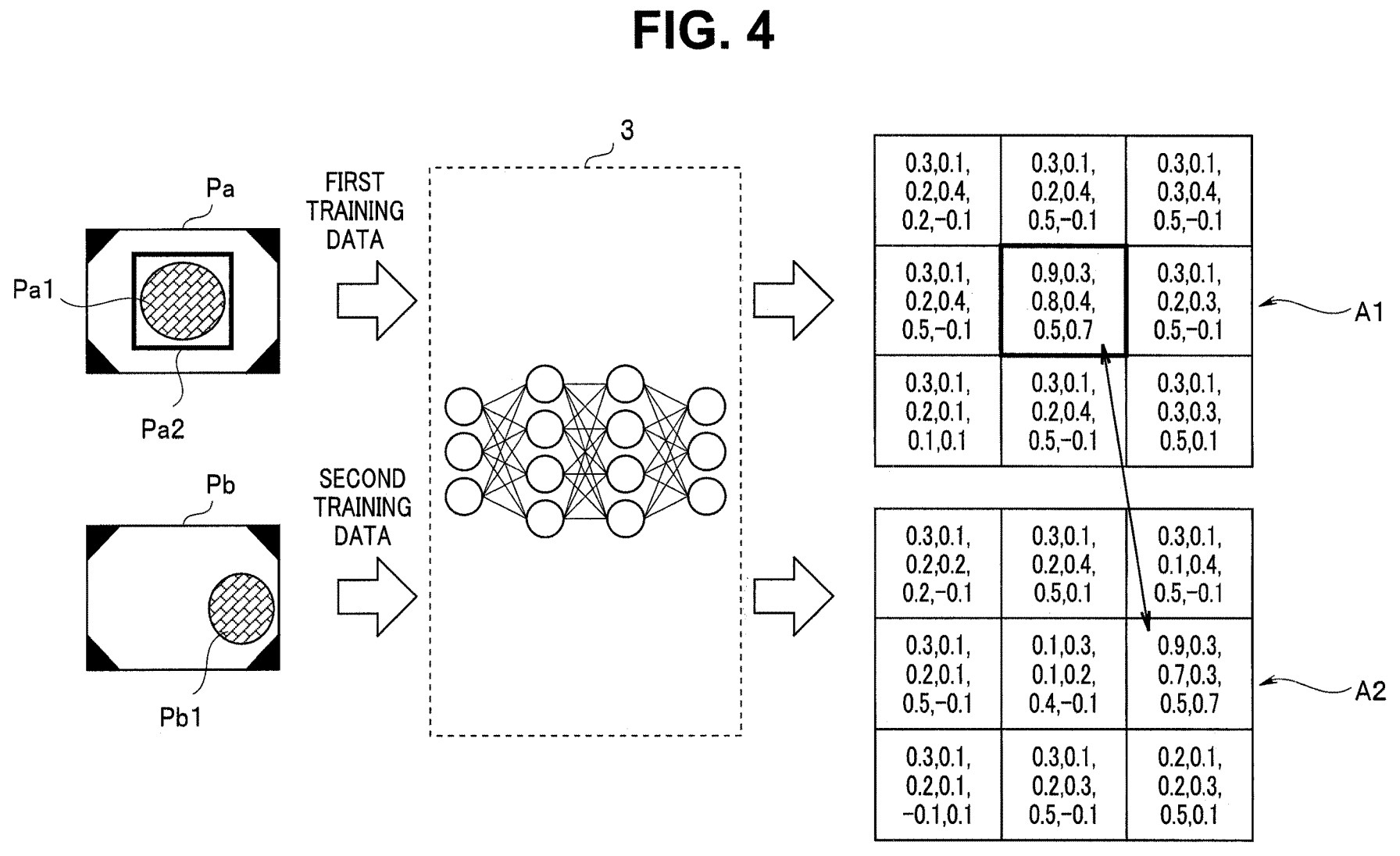

Next, the operation in the embodiment with the foregoing configuration will be described with reference to FIGS. 3 and 4. FIG. 3 is a flowchart for illustrating the operation in the first embodiment. FIG. 4 is an explanatory view for illustrating the operation in the first embodiment.

In S1 of FIG. 3, the initialization unit 12 of the NN control circuit 10 initializes the parameters of the neural network (NN) 3. However, the initialization unit 12 is not an essential component, and the initialization of the parameters is not an essential step. Although the initialization of the NN is performed after the start in FIG. 3, the present invention is not limited to such a configuration. For example, the present invention can be applied to an NN trained with other data or methods, without the initialization performed. The input control unit 11 of the NN control circuit 10 inputs to the neural network 3 an image that is the first training data stored in the teaching data memory 1 (S2). The input control unit 11 also inputs to the neural network 3 an image that is the second training data stored in the image data memory 2. In addition, the input control unit 11 inputs to the position search unit 5 the correct answer information stored in the teaching data memory 1.

The left views of FIG. 4 illustrate an image Pa that is the first training data, and an image Pb that is the second training data. The image Pa includes an image portion Pa1 of a lesion area, such as a malignant tumor, as a recognition target. In the image Pa, a frame box Pa2, which indicates the position of the image portion Pa1, is illustrated as surrounding the image portion Pa1. The first training data is associated with the position information of the frame box Pa2, that is, the correct answer position information (which does not mean that the frame box is drawn on the image). Meanwhile, the image Pb includes an image portion Pb1 of the same class as the lesion area, such as the malignant tumor, that is the recognition target in the image Pa.

As described above, correct answer information is set on the first training data, whereas correct answer information is not set on the second training data. The NN application unit 13 applies such first training data and second training data to the neural network 3 (S3 and S4). Accordingly, the neural network 3 outputs a first array group A1 and a second array group A2 illustrated in the right views of FIG. 4.

Each of the first array group A1 and the second array group A2 in FIG. 4 includes vectors (i.e., arrays) obtained for a plurality of respective regions resulting from the division of the image. Although the image is divided into nine regions in FIG. 4, the present invention is not limited to such a configuration. In other words, the neural network 3 outputs the first array group A1 including 3×3 vectors (i.e., first arrays) determined for the nine respective regions of the image Pa by processing the image Pa. In addition, the neural network 3 outputs the second array group A2 including 3×3 vectors (i.e., second arrays) determined for the nine respective regions of the image Pb by processing the image Pb. The neural network 3 outputs the thus determined vectors to the position search unit 5.

In the example of FIG. 4, the correct answer position of the recognition target in the image Pa is the central region of the image Pa. Thus, a vector (0.9, 0.3, 0.8, 0.4, 0.5, 0.7) in the central region (surrounded by a thick frame) of the first array group A1 represents the image features of the image portion Pa1. Meanwhile, although the image Pb is not provided with correct answer position information, it is considered that the image Pb includes an image portion of the same recognition target that has image features similar to the image features of the image portion Pa1.

The position search unit 5 is provided with the first array group A1 and the second array group A2 from the neural networks 3, and is provided with the correct answer position information as the first correct answer information from the teaching data memory 1 (S5). The position search unit 5 identifies a vector in the central region of the image corresponding to the correct answer position in the first array group A1 (hereinafter referred to as a correct answer vector), and checks the correct answer vector as the first array against the vector of each region of the second array group A2 (S6), and then estimates the position of a region having a vector, which is most similar to the correct answer vector, as the candidate correct answer position where the recognition target is present. Then, the position search unit 5 outputs information on the determined candidate correct answer position (i.e., second correct answer information) to the teaching data generating unit 6.

For example, the position search unit 5 may determine the difference between the correct answer vector and each vector in the second array group A2, and may determine the position of a region having a vector with the smallest difference as the candidate correct answer position. For example, in the example of FIG. 4, a vector (0.9, 0.3, 0.7, 0.3, 0.5, 0.7) in the right-side central region of the second array group A2 has the smallest error with respect to the correct answer vector. Thus, the position of the region is determined as the candidate correct answer position. In other words, a position corresponding to the right-side central region in the image Pb is determined as a region where the lesion is appearing.

The teaching data generating unit 6 is provided with the image (i.e., the second training data) for which the candidate correct answer position has been determined by the position search unit 5 from the image data memory 2, and then provides the position information of the candidate correct answer position to the image, thereby obtaining teaching data. This corresponds to the annotation that has been conventionally performed manually by a human being. Note that regarding the correct answer class information, the same information as the correct answer class information set on the first training data is provided to the second training data. The teaching data generating unit 6 provides the thus generated teaching data to the teaching data memory 7 so that the teaching data is stored in the teaching data memory 7.

As described above, in the present embodiment, the first training data, which has been manually annotated and thus is provided with the correct answer information, and the second training data, which has not been annotated, are provided to the neural network. Then, the output vector corresponding to the correct position for the first training data from the neural network and the output vectors for the second training data from the neural network are compared. Accordingly, the candidate correct answer position of the second training data is determined so that teaching data based on the second training data is acquired. Annotating the first training data can acquire the correct answer information for the second training data. In other words, annotating a relatively small number of images can acquire a large number of annotated images. This can significantly reduce the labor required for the annotation.

Second Embodiment

Figure 5:
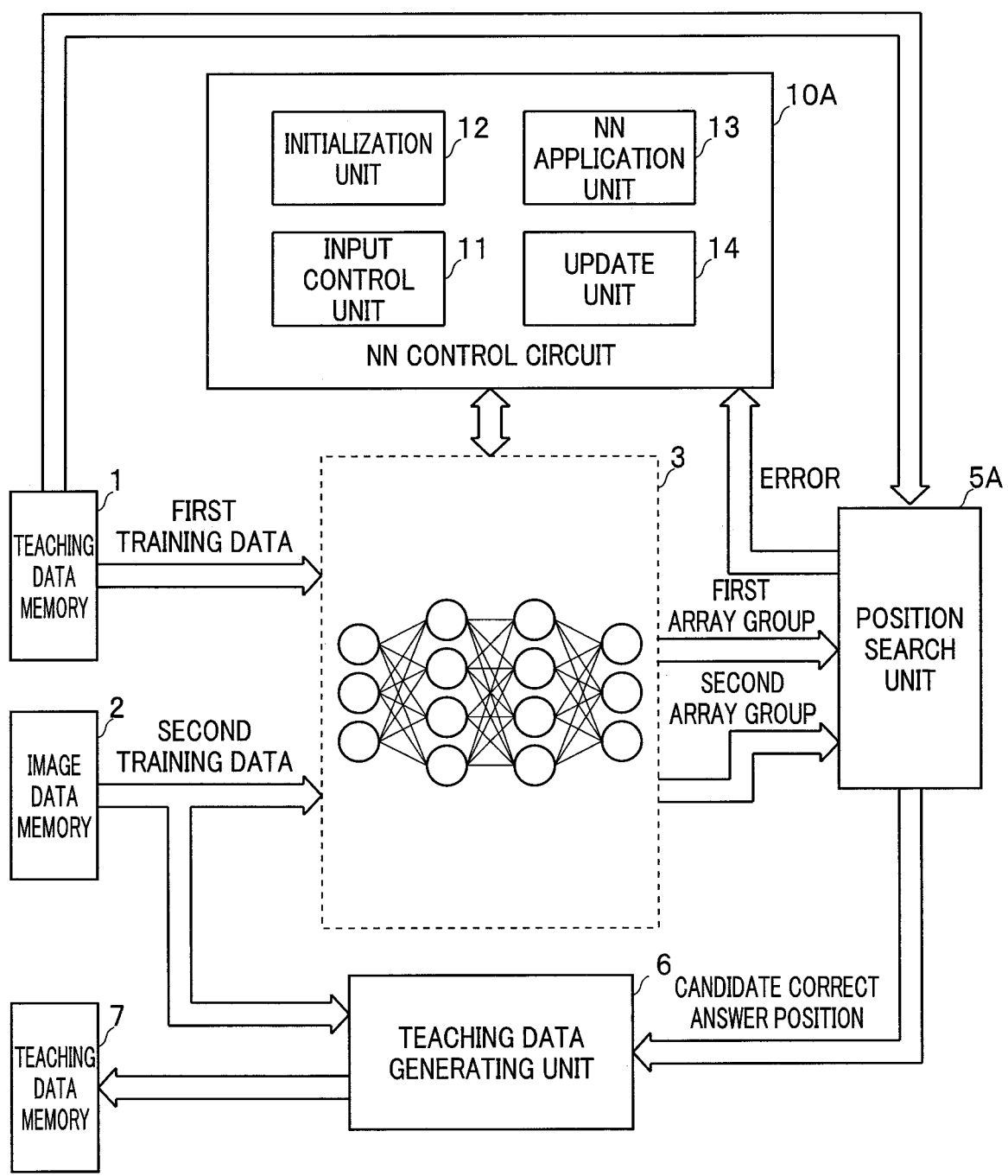
FIG. 5 is a block diagram illustrating a second embodiment of the present disclosure.

FIG. 5 is a block diagram illustrating a second embodiment of the present invention. In FIG. 5, the same components as the components in FIG. 1 are denoted by the same reference signs, and repeated description will be omitted.

In the first embodiment, teaching data, which has been already annotated, is provided to a neural network, and a correct answer vector obtained by the neural network is used to automatically annotate an unannotated image. Further, in the present embodiment, the neural network is trained using the correct answer vector.

The neural network 3 in the first embodiment is not trained to recognize the correct answer position information, and is not trained to a level that allows for the identification of a lesion area, for example. The present embodiment is directed to training such a neural network 3.

A learning data generating apparatus in FIG. 5 is different from the learning data generating apparatus in FIG. 1 in that a position search unit 5A is adopted instead of the position search unit 5, and an NN control circuit 10A is adopted instead of the NN control circuit 10. As with the position search unit 5, the position search unit 5A detects a region having a vector with the smallest error with respect to the correct answer vector as the candidate correct answer position, and outputs information on the candidate correct answer position to the teaching data generating unit 6. Further, in the present embodiment, the position search unit 5A is configured to determine an error (training loss) between output vector of the neural network 3 and the corresponding correct answer vector, and output information on the error to the NN control circuit 10A. Here, in addition to the error between the output of neural network 3 and the corresponding correct answer, the error between the output vectors (first array vector and second array group's vector) of neural network 3, or both, may be used as the training loss.

An update unit 14 of the NN control circuit 10A updates the parameters of the neural network 3 using the error (training loss) determined by the position search unit 5A. For example, the update unit 14 may update the parameters in accordance with the existing SGD (stochastic gradient descent) algorithm. The update expression of SGD is publicly known. Substituting the error value into the update expression of SGD allows for the calculation of each updated parameter of the neural network 3.

Figure 6:
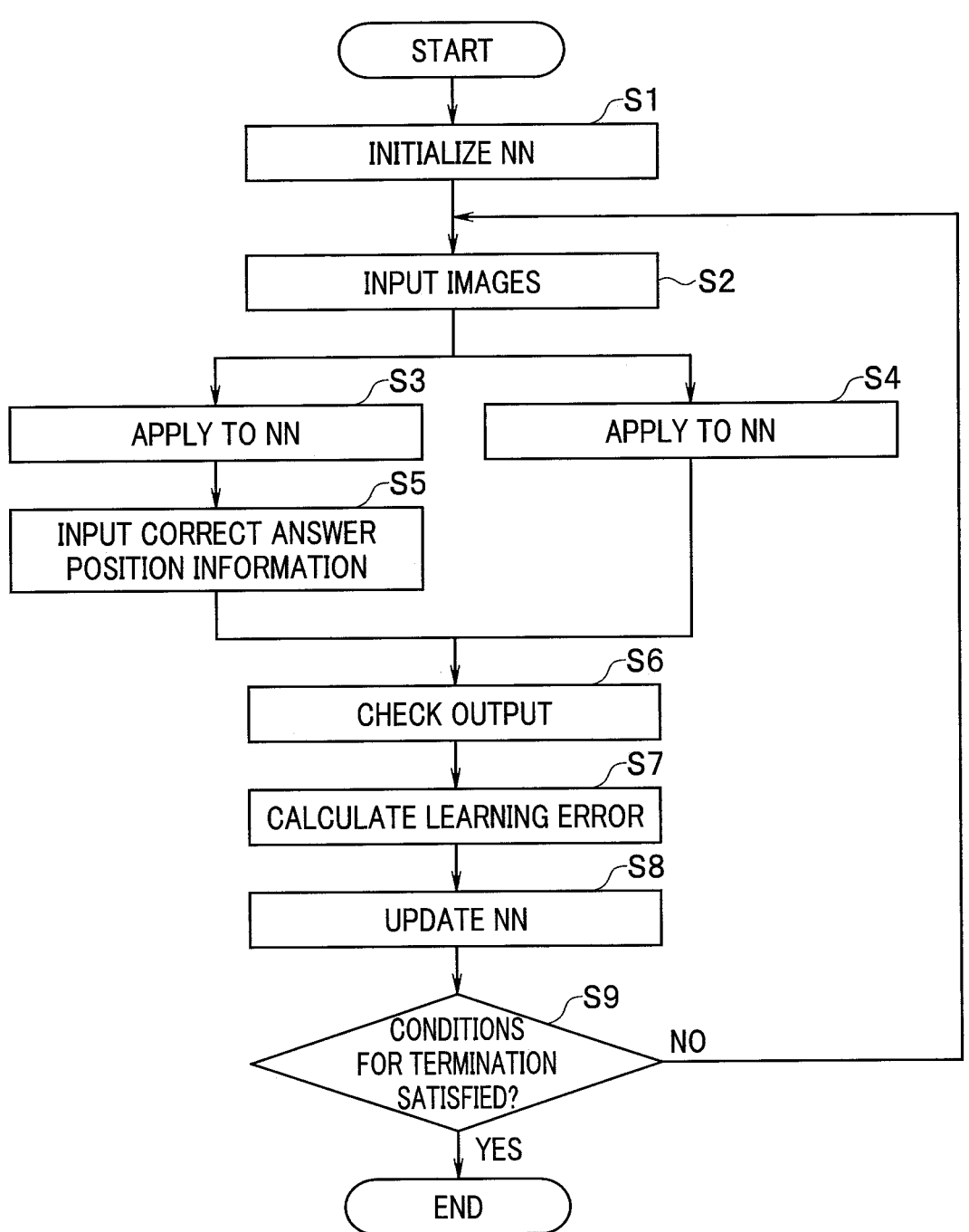
FIG. 6 is a flowchart for illustrating an operation in the second embodiment.

Next, the operation in the embodiment with the foregoing configuration will be described with reference to FIG. 6. FIG. 6 is a flowchart for illustrating the operation in the second embodiment. In FIG. 6, the same procedures as the procedures in FIG. 3 are denoted by the same reference signs, and repeated description will be omitted.

Processes in S1 to S6 of FIG. 6 are similar to the processes in S1 to S6 of FIG. 3. In the present embodiment, the position search unit 5A calculates an error between the vectors in the regions that are the checking targets of S6 (S7), and outputs the calculated error to the NN control circuit 10A. The update unit 14 of the NN control circuit 10 updates the parameters of the neural network 3 based on the inputted error, using the SGD method, for example (S8).

Next, the NN application unit 13 determines if conditions for terminating the training are satisfied (S9). The NN application unit 13 determines if a prescribed number of epochs has been reached, and if not (NO in S9), the process returns back to S2 so that S2 to S9 are repeated. Meanwhile, if the prescribed number of epochs has been reached (YES in S9), the NN application unit 13 terminates the process.

As described above, the present embodiment is advantageous in that effects similar to the effects in the first embodiment can be obtained, and a neural network can be trained. Accordingly, the accuracy of the determination of the correct answer position can be increased.

Note that a publicly known Siamese network may be adopted in the present embodiment. In such a case, data augmentation, such as a process of changing chroma, is applied to respective pieces of training data stored in the teaching data memories 1 and 7 so that augmented images are generated, and the augmented images are provided as training data to NNs. Note that in the Siamese network, respective augmented images are provided to networks with the same configuration.

(First Modification)

Figure 7:
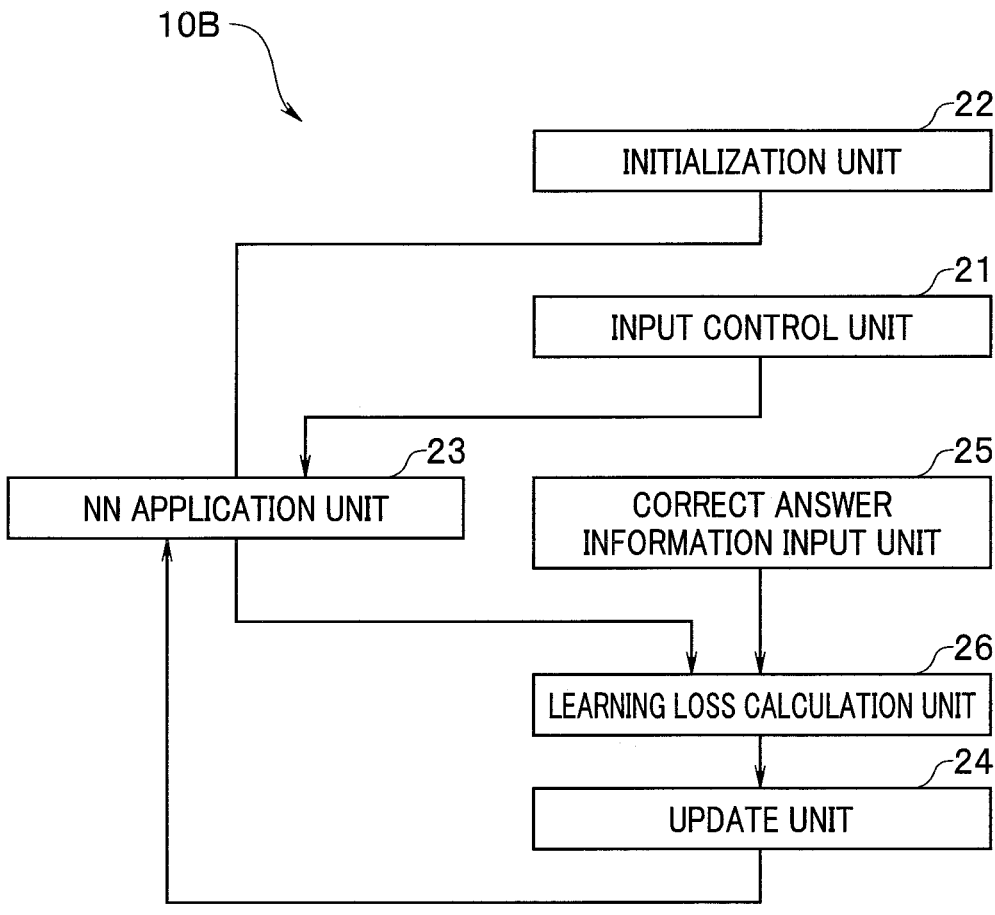
FIG. 7 is a block diagram illustrating a modification.

FIG. 7 is a block diagram illustrating a modification.

The present modification is directed to creating a neural network configured to identify a lesion area and identify the class of the lesion area, using the acquired teaching data, for example (hereinafter referred to as a third neural network (NN)). In such a case, an NN control circuit 10B may have a configuration illustrated in FIG. 7. In FIG. 7, the configurations of an input control unit 21, an initialization unit 22, an NN application unit 23, and an update unit 24 are respectively similar to the configurations of the input control unit 11, the initialization unit 12, the NN application unit 13, and the update unit 14 in FIG. 5.

The third NN adopted in the modification is controlled by the NN control circuit 10B to output, as a classification output, a probability value (i.e., a score) indicating which classification category (i.e., class, type) each inputted image belongs to with a high probability. In other words, in the first and second embodiments, teaching data is generated from the second training data stored in the image data memory 2, using teaching data stored in the teaching data memory 1, and the thus generated teaching data is stored in the teaching data memory 7. In the first modification, an NN for identifying the position and class of a lesion area is trained using the teaching data stored in the teaching data memory 1 and the teaching data memory 7.

The NN application unit 23 provides such training data to the NN, and thus causes the NN to output a classification output. The NN provides the classification output to a training loss calculation unit 26. In addition, a correct answer information input unit 25 outputs the correct answer information stored in the teaching data memories 1 and 7 to the training loss calculation unit 26. Thus, the training loss calculation unit 26 is provided with the correct answer information, which has been assigned to each image corresponding to each classification output, from the correct answer information input unit 25, and determines as a training loss an error between each classification output and each correct answer information. Note that when the NN is a Siamese network, the training loss calculation unit 26 determines as a training loss an error between vector data corresponding to respective augmented images. The training loss determined by the training loss calculation unit 26 is provided to the update unit 24. The update unit 24 updates parameters of the NN based on the inputted training loss.

Figure 8:
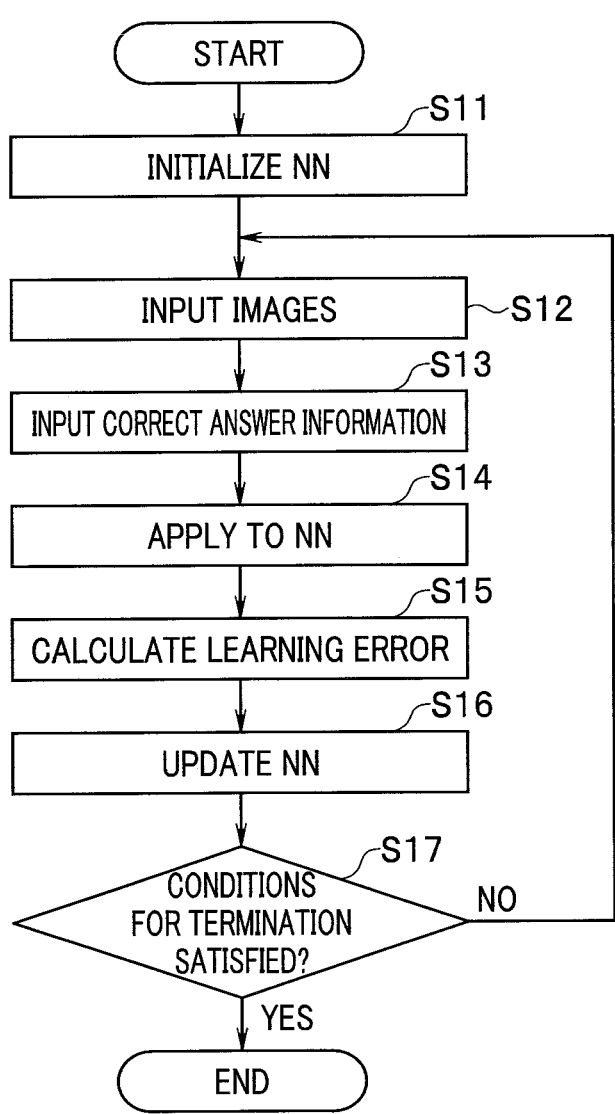
FIG. 8 is a flowchart illustrating the modification.

The operation in the modification with the foregoing configuration will be described with reference to FIG. 8. FIG. 8 is a flowchart illustrating the operation in the modification.

The initialization unit 22 of the NN control circuit 10B initializes the parameters of the third NN (S11). The input control unit 21 of the NN control circuit 10B inputs to the third NN images that are the training data stored in the teaching data memories 1 and 7 (S12). The correct answer information input unit 25 inputs to the training loss calculation unit 26 the correct answer information stored in the teaching data memories 1 and 7 (S13).

The NN application unit 23 applies the training data to the third NN (S14). Accordingly, the third NN outputs a classification output to the training loss calculation unit 26. The training loss calculation unit 26 determines a learning error between the classification output and the correct answer information, and outputs the learning error to the update unit 24 (S15). The update unit 24 of the NN control circuit 10B updates the parameters of the third NN based on the inputted training loss, using the SGD method, for example (S16).

Next, the NN application unit 23 determines if conditions for terminating the training are satisfied (S17). The NN application unit 23 determines if a prescribed number of epochs has been reached, and if not (NO in S17), the process returns back to S2 so that S12 to S17 are repeated. Meanwhile, if the prescribed number of epochs has been reached (YES in S17), the NN application unit 23 terminates the process.

Accordingly, an inference model is built that is configured to make an inference of information indicating the position and class of a lesion area in response to an inputted image, for example. When such an inference model is built, a large number of teaching data are obtained using a small number of teaching data. This can reduce the labor required for the processes of annotation to learning.

The present modification discloses the following learning method performed by a processor. In other words, the present modification discloses a learning method implemented by a processor including hardware, the processor being configured to receive first training data obtained by picking up a still image from a series of images and first correct answer information that is position information of a region in which a recognition target is appearing in the first training data; receive second training data obtained by picking up a still image from the series of images; input the first training data into a first neural network to thereby cause the first neural network to output a first array group constituted of a plurality of arrays; input the second training data into a second neural network to thereby cause the second neural network to output a second array group constituted of a plurality of arrays; identify a first array from the first array group based on the first correct answer information, the first array being an array corresponding to the recognition target; compare the first array and each of the plurality of arrays constituting the second array group, to estimate a region in which the recognition target is appearing in the second training data, and to create second correct answer information in the second training data, the second correct answer information being position information of the recognition target; input the first and second training data into a third neural network to thereby cause the third neural network to output a third array group constituted of a plurality of arrays; determine a training loss based on each array of the third array group and the first and second correct answer information; and update parameters of the third neural network based on the training loss.

(Second Modification)

Figure 9:
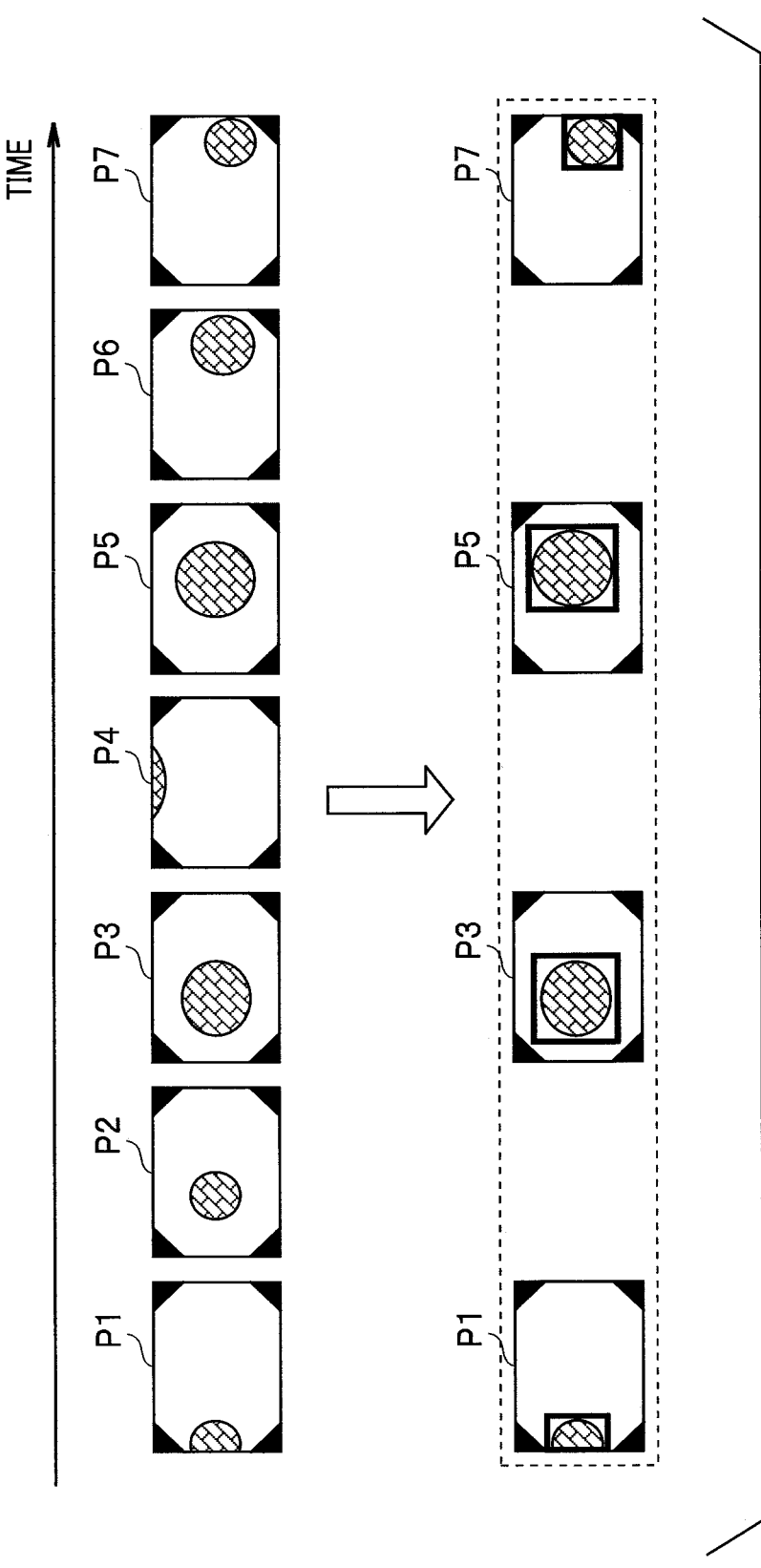
FIG. 9 is an explanatory view for illustrating a second modification.

FIG. 9 is an explanatory view for illustrating a second modification. In each of the foregoing embodiments, for example, teaching data, which has been obtained by manually annotating selected images picked up from a series of endoscopic images, is used to automatically annotate non-selected images that have not been picked up. However, although the selected images that include a recognition target are manually picked up, the non-selected images may not include the recognition target. For example, provided that the images in the series of images are endoscopic images, there may be non-selected images not including an image portion of a recognition target if a motion of an organ that is a target is intense or if a motion of an endoscope for performing an endoscopic examination is rapid, in which case a lesion area that is the recognition target is located outside the shooting range.

FIG. 9 illustrates such images. The upper views of FIG. 9 illustrate a series of endoscopic images including a plurality of frames picked up with an endoscope. A shaded circle in each of images P1, P2, . . . indicates an image portion of a malignant tumor. The lower views of FIG. 9 illustrate images picked up at equal intervals from the endoscopic images, or images obtained by picking up only images in focus. Note that FIG. 9 illustrates an example in which images P1, P3, P5, and P7 are picked up. For each of the picked up images, the image portion of the malignant tumor is manually marked by a doctor et al. as illustrated in the lower views of FIG. 9.

Meanwhile, the second training data is considered to be, for example, picked up images P2, P4, P6, . . . between the picked up images P1, P3, P5, and P7. However, the image P4 includes the image portion of the malignant tumor, which is the recognition target, only slightly, and thus is not suitable for teaching data. Thus, the position search unit 5 or the position search unit 5A adopts at least one of the following checking methods (1) to (3).

(1) If an error is greater than a threshold, it is regarded that a lesion is not appearing in the image. Thus, checking is not performed. Note that as a threshold calculation method, a method of calculating an error of a lesion area between images that have been already marked, and determining a threshold based on the calculation result is used.

(2) When the correct answer vector is checked against the vector of each region, if the difference between the minimum error and the second minimum error is smaller than a predetermined threshold, checking is not performed.

(3) The amounts of motions in the series of images are separately acquired based on information of an accelerometer, for example, and checking is not performed on frames having large motions.

As described above, in the present modification, when an image that is not suitable for teaching data is used as the second training data, checking is not performed. This can prevent the creation of teaching data based on the second training data.

The present invention is not limited to each of the foregoing embodiments, and can be embodied with the components modified without departing from the gist of the invention in the implementation phase. Various inventions can be provided by combining a plurality of components disclosed in each of the foregoing embodiments as appropriate. For example, some of the components disclosed in the embodiments may be omitted. Further, components in different embodiments may be combined as appropriate.

Among the techniques described herein, many of the controls and functions that have been described mainly with reference to the flowcharts can be set by a program. Such controls and functions can be implemented as the program is read and executed by a computer. The program can be partly or entirely recorded or stored as a computer program product in a portable medium, such as a flexible disk, CD-ROM, or nonvolatile memory; or a storage medium, such as a hard disk or volatile memory, and can be distributed or provided at the time of shipment of the product or via the portable medium or a communication line. A user is able to easily implement the learning data generating apparatus of the present embodiment by downloading the program via a communication network and installing the program on a computer, or installing the program on a computer from a recording medium.

What is claimed is:

1. A learning data generating apparatus comprising a processor comprising hardware, the processor being configured to:

receive first training data obtained by picking up a still image from a series of images and first correct answer information that is position information of a region in which a recognition target is appearing in the first training data:

receive second training data obtained by picking up another still image from the series of images;

input the first training data into a neural network to thereby cause the neural network to output a first array group constituted of a plurality of vectors;

input the second training data into the neural network to thereby cause the neural network to output a second array group constituted of a plurality of vectors;

set, as a first array, a vector at a position indicated by the first correct answer information in the first array group; and determine a difference between the first array and each of the plurality of vectors constituting the second array group, to create second correct answer information in the second training data based on the difference, the second correct answer information being position information of the recognition target.

2. The learning data generating apparatus according to claim 1, wherein the processor is further configured to:

compare the first array and each of the plurality of vectors constituting the second array group to identify an array having a smallest difference; and estimate the array having the smallest difference as corresponding to a region in which the recognition target is appearing in the second training data.

3. The learning data generating apparatus according to claim 1, wherein the series of images is a series of moving images.

4. The learning data generating apparatus according to claim 1, wherein the series of images includes a plurality of frames each obtained by picking up an image of a same target using a same image pickup apparatus under a same image pickup environment in a period from a first predetermined time point to a second predetermined time point.

5. The learning data generating apparatus according to claim 1, wherein the first training data is one of a plurality of selected images picked up from the series of images and provided with the position information, and the second training data is interposed between the selected images on a time series axis among the series of images.

6. The learning data generating apparatus according to claim 3, wherein the second training data is interposed between, among the series of images, the first training data and an image of a frame next to the first training data on a time series axis among selected images.

7. The learning data generating apparatus according to claim 1, wherein the second training data is an image of a frame next to the first training data on a time series axis among the series of images.

8. The learning data generating apparatus according to claim 5, wherein the processor is further configured to set the second training data from the selected images.

9. The learning data generating apparatus according to claim 1, wherein the processor is further configured to:

determine if the first training data and the second training data have been picked up from the same series of images, and input the first training data and the second training data into the neural network if the first training data and the second training data have been picked up from the same series of images.

10. The learning data generating apparatus according to claim 1, wherein the processor is further configured to, when the difference is greater than a predetermined threshold, not estimate the array having the smallest difference as corresponding to a region in which the recognition target is appearing in the second training data.

11. A learning data generating method performed with a learning data generating apparatus, the learning data generating apparatus including an image input processor comprising hardware, a first neural network application processor comprising hardware, a second neural network application processor comprising hardware, a correct answer position input processor comprising hardware, and an output checking processor comprising hardware, the method comprising:

acquiring, with the image input processor, first training data obtained by picking up a still image from a series of images and first correct answer information that is position information of a recognition target in the first training data;

acquiring, with the image input processor, second training data obtained by picking up another still image from the series of images;

inputting, with the first neural network application processor, the first training data into a neural network to thereby cause the neural network to output a first array group constituted of a plurality of vectors;

inputting, with the second neural network application processor, the second training data into a neural network to thereby cause the neural network to output a second array group constituted of a plurality of vectors;

setting, as a first array, with the correct answer position input processor, a vector at a position indicated by the first correct answer information in the first array group; and determining, with the output checking processor, a difference between the first array and each of the plurality of vectors constituting the second array group, to create second correct answer information in the second training data based on the difference, the second correct answer information being position information of the second training data.

12. A non-transitory recording medium having a learning data generating program recorded thereon, the program being configured to cause a learning data generating apparatus to:

acquire first training data obtained by picking up a still image from a series of images and first correct answer information that is position information of a recognition target in the first training data;

acquire second training data obtained by picking up another still image from the series of images;

input the first training data into a neural network to thereby cause the neural network to output a first array group constituted of a plurality of vectors;

input the second training data into a neural network to thereby cause the neural network to output a second array group constituted of a plurality of vectors;

set, as a first array, a vector at a position indicated by the first correct answer information in the first array group; and determine a difference between the first array and each of the plurality of arrays vectors constituting the second array group to create second correct answer information in the second training data based on the difference, the second correct answer information being position information of the second training data.

\* \* \* \* \*